US012541496B2

United States Patent
Alexander et al.

(10) Patent No.: US 12,541,496 B2
(45) Date of Patent: Feb. 3, 2026

(54) SYSTEMS AND METHODS OF RETRIEVAL AUGMENTED GENERATION OF TEXT AND ACTIONS

(71) Applicant: Salesforce, Inc., San Francisco, CA (US)

(72) Inventors: Zachary Alexander, San Francisco, CA (US); Sitaram Asur, San Francisco, CA (US); Regunathan Radhakrishnan, San Francisco, CA (US); Kiran Ramnath, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/749,760

(22) Filed: Jun. 21, 2024

(65) Prior Publication Data

US 2025/0390480 A1    Dec. 25, 2025

(51) Int. Cl.
*G06F 16/00*    (2019.01)
*G06F 16/22*    (2019.01)
(Continued)

(52) U.S. Cl.
CPC ...... *G06F 16/2272* (2019.01); *G06F 16/2468* (2019.01); *G06F 16/3329* (2019.01);
(Continued)

(58) Field of Classification Search
CPC ..... G06Q 30/015; G06F 40/35; G06F 40/169; G06F 40/279; G06F 40/134;
(Continued)

(56) References Cited

U.S. PATENT DOCUMENTS 10,565,265 B2    2/2020   Alexander
10,803,127 B2    10/2020  Alexander
(Continued)

FOREIGN PATENT DOCUMENTS

GB    2624275 A  *  5/2024
WO    WO 2021050170 A1  *  3/2021
WO    WO2022240792 A2  *  11/2022

OTHER PUBLICATIONS

Piotr Klosowski, "Deep Learning for Natural Language Processing and Language Modelling", 2018 Signal Processing: Algorithms, Architectures, Arrangements, and Applications (SPA) (Dec. 2018, pp. 223-228).*

(Continued)

*Primary Examiner* — Srirama Channavajjala
(74) *Attorney, Agent, or Firm* — Butzel Long

(57) ABSTRACT

Systems and methods are provided for determining, at a server communicatively coupled to a database, whether any past conversation texts in the database include a message segment that used by one or more service agents in a conversation with a customer. The server samples m-furthest neighbors for at least one of the determined past conversation texts to determine usage data for the at least one of the determined past conversation texts. The samples are indexed for at least one of the determined past conversation texts for retrieval based on a context from the determined usage data to generate an index. A representation of a current conversation between the service agent and the customer is determined, and index is queried using the representation. A large language model (LLM) generates a response that is transmitted to the service agent to be used in the conversation with the customer.

22 Claims, 10 Drawing Sheets

(51) Int. Cl.
  *G06F 16/2458* (2019.01)
  *G06F 16/3329* (2025.01)
  *G06F 16/338* (2019.01)
  *G06F 16/9032* (2019.01)
  *G06F 40/00* (2020.01)
  *G06F 40/30* (2020.01)
  *G06N 20/00* (2019.01)
  *G06Q 30/015* (2023.01)
  *G06F 40/35* (2020.01)

(52) U.S. Cl.
  CPC ...... *G06F 16/338* (2019.01); *G06F 16/90332* (2019.01); *G06F 40/30* (2020.01); *G06N 20/00* (2019.01); *G06Q 30/015* (2023.01); *G06F 40/35* (2020.01)

(58) Field of Classification Search
  CPC ...... G06F 40/186; G06F 40/216; G06F 40/30; G06F 40/284; G06F 40/16; G06F 40/289; G06F 21/54; G06F 21/6218; G06F 16/2272; G06F 16/2468; G06F 16/3329; G06F 16/338; G06F 16/90332; G06N 20/00
  See application file for complete search history.

(56) References Cited

U.S. PATENT DOCUMENTS

| | | | |
|---|---|---|---|
| 11,061,954 B2 | 7/2021 | Alexander | |
| 11,061,955 B2 | 7/2021 | Alexander | |
| 11,327,979 B2 | 5/2022 | Govindarajan | |
| 11,392,828 B2 | 7/2022 | Velasco | |
| 11,580,179 B2 | 2/2023 | Xiu | |
| 11,755,655 B2 | 9/2023 | Asur | |
| 11,960,983 B1* | 4/2024 | Gelfenbeyn | ........ A63F 13/424 |
| 2013/0191738 A1* | 7/2013 | Bank | ........ G06F 40/151 |
| | | | 715/259 |
| 2015/0095017 A1* | 4/2015 | Mnih | ........ G06F 40/216 |
| | | | 704/9 |
| 2016/0365093 A1* | 12/2016 | Nissan | ........ G10L 15/183 |
| 2017/0206891 A1* | 7/2017 | Lev-Tov | ........ G10L 15/063 |
| 2020/0097544 A1 | 3/2020 | Alexander | |
| 2021/0149921 A1 | 5/2021 | Alexander | |
| 2021/0149949 A1 | 5/2021 | Alexander | |
| 2021/0149964 A1 | 5/2021 | Wang | |
| 2021/0150146 A1 | 5/2021 | Alexander | |
| 2021/0407679 A1* | 12/2021 | Liu | ........ G06F 40/30 |
| 2022/0293092 A1* | 9/2022 | Ding | ........ G10L 15/16 |
| 2022/0293094 A1 | 9/2022 | Mao | |
| 2022/0318501 A1 | 10/2022 | Alexander | |
| 2023/0089596 A1 | 3/2023 | Huffman | |
| 2023/0096821 A1* | 3/2023 | Huang | ........ G10L 15/197 |
| | | | 704/235 |
| 2023/0135179 A1* | 5/2023 | Mielke | ........ G06N 5/022 |
| | | | 704/232 |
| 2024/0062010 A1 | 2/2024 | Kale | |
| 2024/0143945 A1 | 5/2024 | Mehrotra | |
| 2024/0211482 A1* | 6/2024 | Bharadwaj | ........ G06F 16/24578 |
| 2024/0296219 A1* | 9/2024 | Gardner | ........ G06F 16/90332 |
| 2024/0346254 A1* | 10/2024 | Liu | ........ G06F 40/40 |
| 2025/0111160 A1* | 4/2025 | Reis Alves | ........ G06F 40/216 |

OTHER PUBLICATIONS

Mrinal Pandey et al., "Speech Recognition of Vedic Sanskrit using Deep Learning Algorithm", 2023 6th International Conference on Information Systems and Computer Networks (ISCON) (Mar. 2023, pp. 1-5).*

Marwa Massaabi et al., "A fuzzy similarity measure for search results evaluation", 2016 IEEE/ACS 13th International Conference of Computer Systems and Applications (AICCSA) (Nov. 2016, pp. 1-6).*

* cited by examiner

SYSTEMS AND METHODS OF RETRIEVAL AUGMENTED GENERATION OF TEXT AND ACTIONS

BACKGROUND

Presently, service agents are provided with written guidelines that are displayed on a computer screen which are read from by the service agent during a conversation with a customer, or are used by the agents to type a message to a customer. It is typically difficult for a service agent to determine the relevant portions of the guidelines while conversing or messaging with the customer. As a result, customers are not always provided the most relevant information, and may be frustrated with a service agent who is unable to quickly resolve an issue they are experiencing or quickly respond to their queries.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
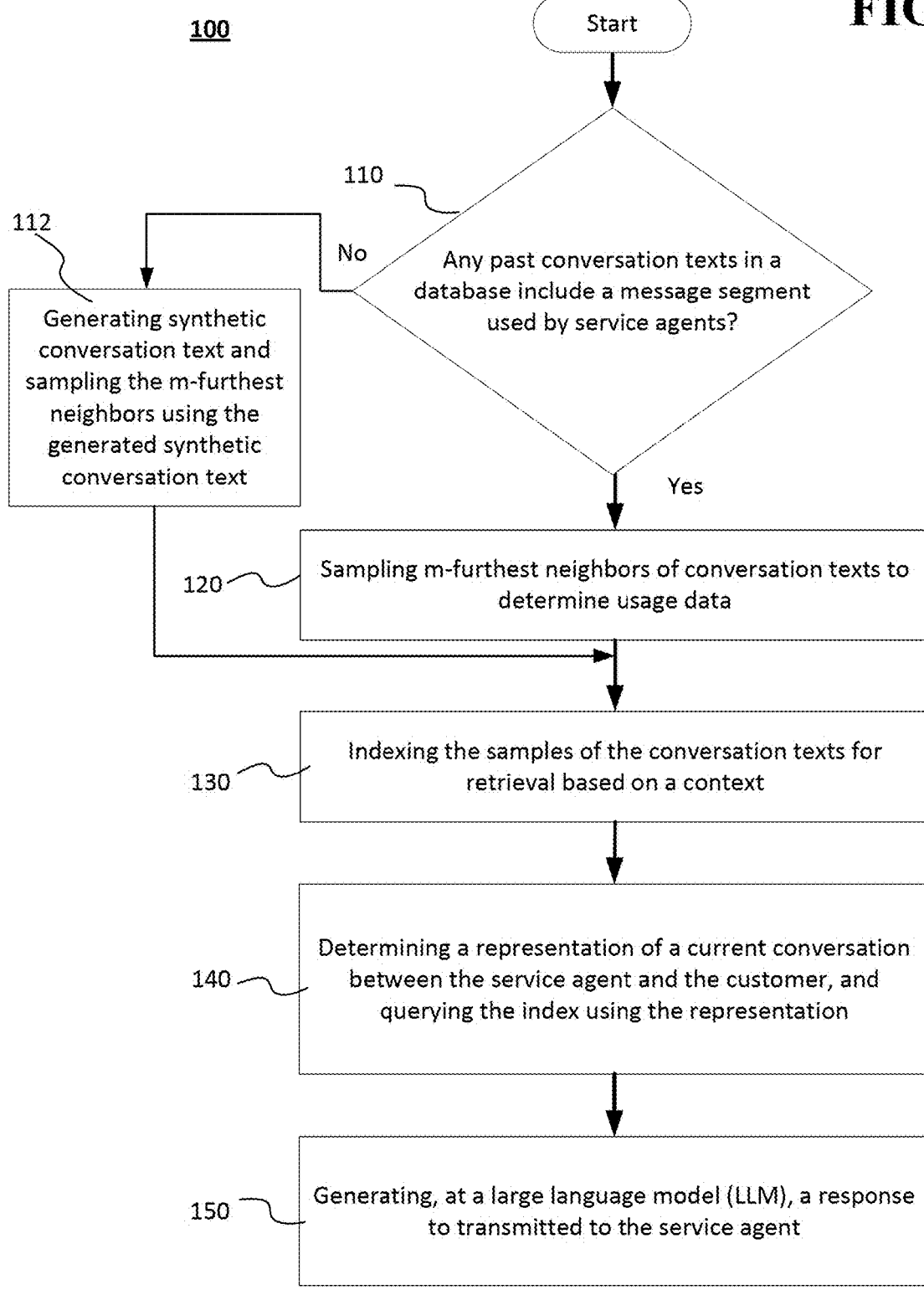
FIGS. 1-5 show example methods of generating message segments to be used by an agent based on context according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and method of generating responses (e.g., message segments) for service agents based on a plurality of existing responses from prior conversations between service agents and customers. The existing responses may be indexed based on context of the conversation between the service agent and a customer. This indexing of the disclosed subject matter may be compatible with any large language model (LLM). The disclosed subject matter may be compatible with any deep neural network for embedding. Service agents may edit the generated response or may provide the generated responses to the customer without editing them first. The systems and methods disclosed throughout allow service agents to respond to customers using appropriate content-rich replies that adhere to company and/or organization policies, style guidelines, brand and/or organization voice, and the like. This may allow different service agents within a company and/or organization to respond similarly. These systems and methods may allow for new service agents to quickly learn how to address customer questions and issues from more experienced agents.

The systems and method of the disclosed subject matter for indexing responses based on context may be extended to recommending service agent actions in a conversational context. From historical conversations between service agents and customers, the systems and methods disclosed herein identify different conversation contexts in which a set of service agent actions have been performed. This set of service agent actions may be a predetermined set of one or more actions and/or procedural matters that may be available for the service agent (e.g., look up a status of an order, look up account details of the customer, perform a password reset operation, perform one or more actions to verify the identity or credentials of the customer, or the like). An index may be created with keys configured to embed the conversation context in which a particular service agent action was performed. The value for that corresponding key may be based on the action. Given this type of index, relevant actions may be retrieved and recommend that a service agent may perform in a given conversation context.

That is, for both retrieving relevant responses and/or actions, the indexing of the responses and/or actions may be based on identifying context from a conversation between a service agent and a customer, and embedding the context into the indexing system (e.g., using keys) for the responses and/or actions so that an appropriate response and/or action may be retrieved.

Implementations of the disclosed subject matter different from previous systems in that they provide relevant responses and/or actions to be used by service agents based on the context of the current conversations with customers. Implementations of the disclosed subject matter may generate synthetic conversations between a service agent and a customer when past responses may not exist for a conversational context. This may be useful, for example, when the system is newly-installed and the database may not have many stored conversations between service agents and customers. The generated synthetic conversations may be used to generate relevant responses for a conversation between the service agent and customer.

Implementations of the disclosed subject matter may provide offline-indexing using additional metadata for each response and/or message segment. The indexing may include dialog-act (e.g., spoken utterance classification), agent-intent (e.g., indexing based on an intent of a service agent in assisting a customer), tone (e.g., tone of a response to be used based on statements made by a customer), and the like.

FIGS. 1-5 show example operation of method 100 of generating message segments to be used by an agent based on context according to implementations of the disclosed subject matter. At operation 110, a server that is communicatively coupled to a database (e.g., server 700 and database 710 shown in FIG. 9 and described in detail below) may determine whether any past conversation texts in the database include a message segment that was used by one or more service agents in a conversation with a customer. For example, the message segment may be one or more sentences that were used by the service agent in a conversation with the customer in response to an inquiry by the customer.

That is, the server may perform a scan of the database to determine whether a given message segment was used by a service agent in a conversation with a customer. In some implementations, the server may perform one or more preprocessing operations. For example, the server may replace one or more placeholders in the database with regexes, where the regexes may be one or more regular expressions, which may be a sequence of characters that specifies a match pattern in text. The placeholders may be replaced to increase the accuracy of the scan for the message segment in the database.

The server may scan of the database to determine whether the message segment was used in a past conversation between one or more agents and customer in a plurality of ways. The message segment may be from a current conversation between the service agent and the customer. In one example of the scan, the server may determine if there is an exact match between the message segment (e.g., from an utterance by the service agent that may be converted to text) from the current conversation and one or more message segments stored in the database and the utterance by the service agent.

In some implementations, the server may determine a fuzzy similarity score based on a sparse representation and/or a dense representation when determining whether any past conversation texts in the database include the message text at operation 110. As the exact match operations described above may miss relevant message segments that may be useful to the service agent, the fuzzy similarity score may be determined to capture other relevant message segments from the database. For example, the server may determine a fuzzy similarity score based on a sparse or dense representation, and a match between the message segment from the service agent and a message segment stored in a database may be determined based on the fuzzy similarity score.

A sparse representation may represent a signal with a linear combination of a small number of data points from a predefined dataset. A sparse representation may be one where most of the values in the data are zero, and only a few values are non-zero. This is often the case in text data, where each document may only contain a small subset of all possible words. Sparse representations may be more memory-efficient and computationally efficient for certain algorithms. For example, the sparse representation may be a bag-of-words representation (i.e., a set of unordered words), a BM25 representation (which may be used to determine relevance and/or ranking), a TD-IDF (term frequency-inverse document frequency) representation (which may be a measure of importance of a word in a collection), or the like.

A dense representation may be one where most of the values in the data are non-zero. In some implementations, the dense representation may be vector embedding representations from a pretrained deep neural network (e.g., deep neural network 760 shown in FIG. 9). In some implementations, cosine similarity may be used to determine a dense representation, where the cosine representation measures a similarity between two non-zero vectors defined in an inner product space. Cosine similarity may be the cosine of the angle between the vectors (i.e., the dot product of the vectors divided by the product of their lengths). That is, the cosine similarity does not depend on the magnitudes of the vectors, but only on their angle. While dense representations may be useful for capturing intricate interactions between data points, sparse representations may minimize the amount of a dataset. Dense representations may be beneficial to determine overlaps, and sparse representations may be useful in finding he exact words (including industry terms and/or jargon) in message segments in the database that is being scanned.

If the server determines that there are no past conversation texts in the database that include the message segment, the server may generate synthetic conversation text using a large language model (LLM) (e.g., LLM 750 shown in FIG. 9) at operation 112. For example, if the system that uses the disclosed subject matter is newly installed with a company or organization, there may be a reduced amount of data of previous service agent interactions with customers, so the LLM may be used to generate the synthetic conversations. As described below in connection with FIG. 8, the server may generate a prompt to be provided to the LLM to generate the synthetic conversation. The server may sample the m-furthest neighbors from the generated synthetic conversation text before indexing the samples at operation 130 described below, where m may denote the number of samples and/or clusters. The sampling of the m-furthest neighbors may include a hierarchical clustering of message segments from the generated synthetic conversation. Initially, each element (e.g., message segment) may be in a cluster of its own. The server may sequentially combine the clusters into larger clusters. A distance d between groups may be defined as the distance between the most distant pair of objects from each group of objects. The dense representation may be used so that the one or more message segments have amply diverse contexts present in the index.

When the server determines that there are past conversation texts in the database that use the message segment at operation 110, the server may sample m-furthest neighbors for at least one of the determined past conversation texts to determine usage data at operation 120. The usage data may be the instances in the database where the past conversations texts may include the message segment. The sampling of the m-furthest neighbors may include a hierarchical clustering of message segments in the database, where m denotes the number of samples or clusters. Again, each element may be in a cluster of its own, where the server may sequentially combine the clusters into larger clusters. A distance d between groups may be defined as the distance between the most distant pair of objects from each group.

At operation 130, the server may index the samples for at least one of the determined past conversation texts for retrieval based on a context from the determined usage data to generate an index. If the conversation texts are synthetically generated, the server may index the samples for the generated synthetic conversation texts for retrieval based on a context to generate an index. In some implementations, the index may be created with keys to embed the conversation context in which a particular service agent action was performed. The value for the corresponding key may be based on the response and/or action.

The sampled m-furthest neighbors to the message segment may be indexed by the server for retrieval. The textual content of the m-furthest neighbors may be ignored when performing the indexing operation to attain symmetry between the indexed contents and the query context. That is, implementations of the disclosed subject matter may index the context of the message segments of the past conversations in the database or the generated synthetic conversations, rather than the text of the message segments of these conversations. The past conversations or the synthetic conversations may be indexed for balance between local and global context for message segments, as described below.

Figure 2:
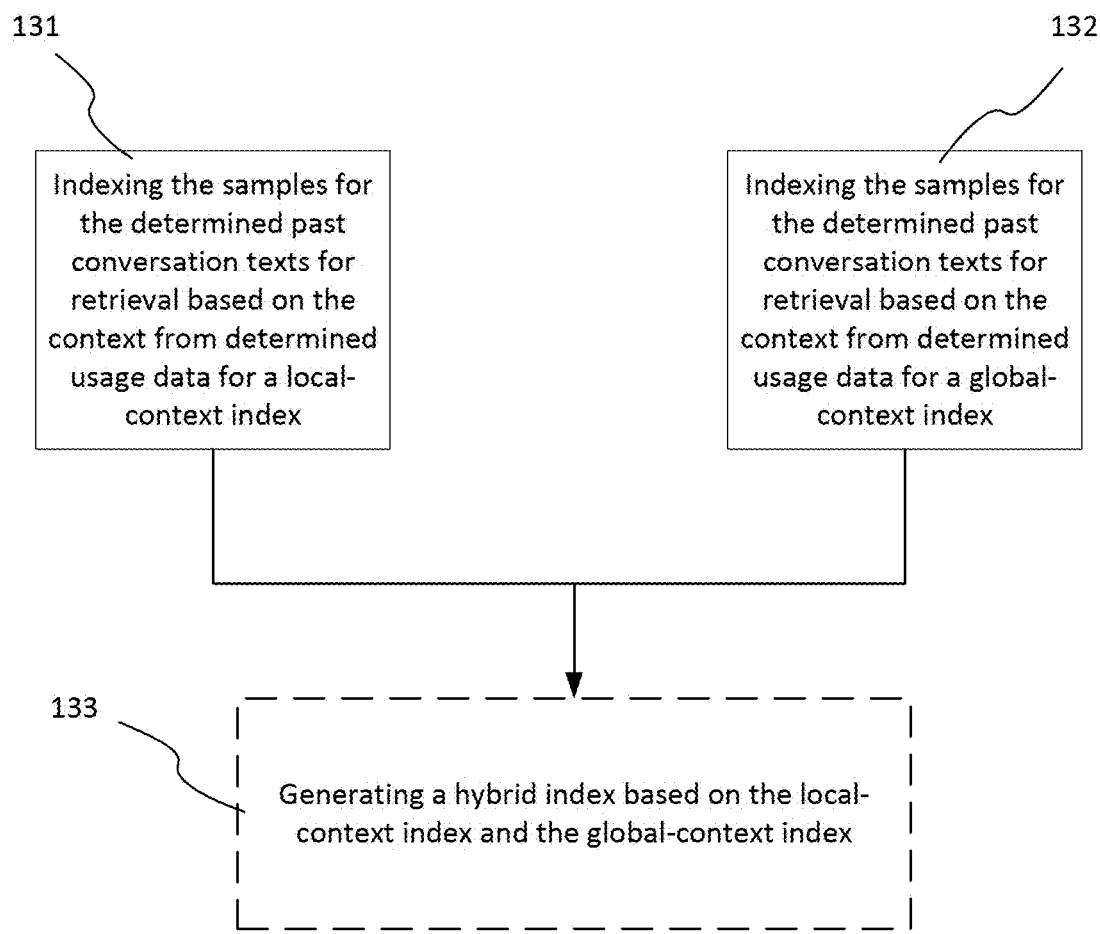

In some implementations, operation 130 may include additional operations, such as those shown in FIG. 2. The server may index the samples for at least one of the determined past conversation texts for retrieval based on the context from the determined usage data for a local-context index at operation 131. In parallel with operation 131, the server may index the samples for at least one of the determined past conversation texts for retrieval based on the context from the determined usage data for a global-context index at operation 132. The sampled m-furthest neighbors to the message segment may be indexed by the server for retrieval. The textual content of the m-furthest neighbors may be ignored when performing the indexing operation to attain symmetry between the indexed contents and the query context available during runtime. The past utterances of the message segments in the database are indexed for balance between local and global context for each message segment. Optionally, the server may generate a hybrid index from at least a portion of the local-context index and/or at least a portion of the global-context index at operation 133.

The indexing may be performed by the server a plurality of different ways. For example, the server may perform dense-only indexing of the past message segment by obtaining vector embedding representations from a pretrained deep neural network (e.g., deep neural network 760 shown in FIG. 9) for context. In another example, the server may perform a sparse-only indexing by obtaining a bag-of-words representation (i.e., a set of unordered words) of the message segments based on TF-IDF (term frequency-inverse document frequency) metric. The TD-IDF may be a measure of importance of a word in a collection (e.g., the database of past conversations with message segments, the m-furthest neighbor message segments, or the like). The TD-IDF may have some adjustment for the fact that some words may appear more frequently in general. In another example, hybrid indexing may be performed by the server based on based on performing both the above-described dense-only and sparse-only indexing, and combining the results.

Figure 3:
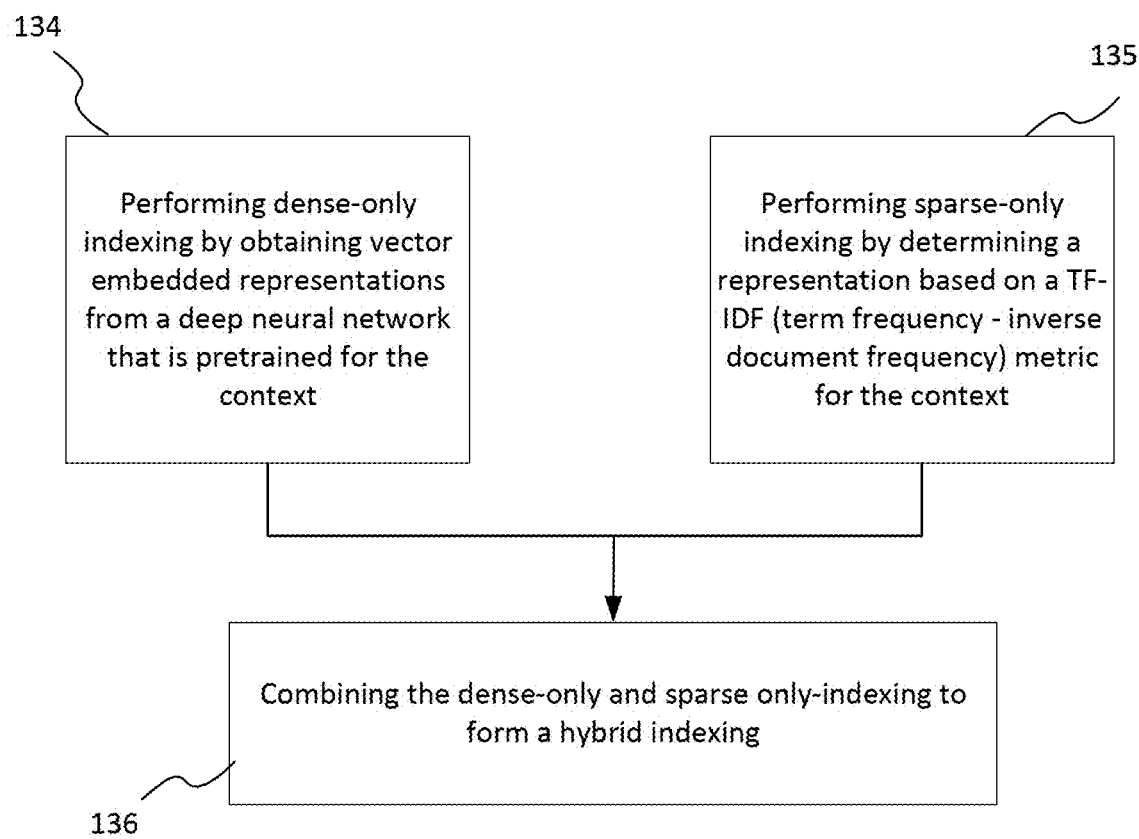

In some implementations, the server may generate the index at operation 130 by performing the example hybrid indexing operations shown in FIG. 3. At operation 134, the server may perform dense-only indexing by obtaining vector embedded representations from the deep neural network communicatively coupled to the server (e.g., deep neural network 760 coupled to server 700) that is pretrained for the context. In parallel with operation 134, the server may perform sparse-only indexing by determining a representation based on a TF-IDF metric for the context at operation 135. At operation 136, the server may combine the results of the dense-only indexing and the sparse-only indexing to form a hybrid index. For example, the server may combine at least a portion of the dense-only indexing and/or a least a portion of the sparse-only indexing to form the hybrid index.

At operation 140 of FIG. 1, the server may determine a representation of a current conversation between the service agent and the customer, and may query the index using the representation. For example, the current conversation may be represented by one or more key words, context, or the like, and a query may be transmitted to the index (e.g., which may be stored in a memory device of the server or in a database communicatively coupled to the server) based on the representation. That is, the index may be queried to determine a text segment to be used with the current conversation, based on the past conversations between agents and customers and the context for the response, and/or based on the synthetically generated conversations that are indexed based on context. This may allow for one or more agents of an organization to provided consistent responses to customers having similar questions and/or issues.

The server may determine a representation for the current conversation between the service agent and the customer by determining a dense-only representation and a sparse-only representation for current conversation, as described below in connection with FIGS. 4A-4B. These representations may be used by the server to query the index that has been generated.

Figure 4A:
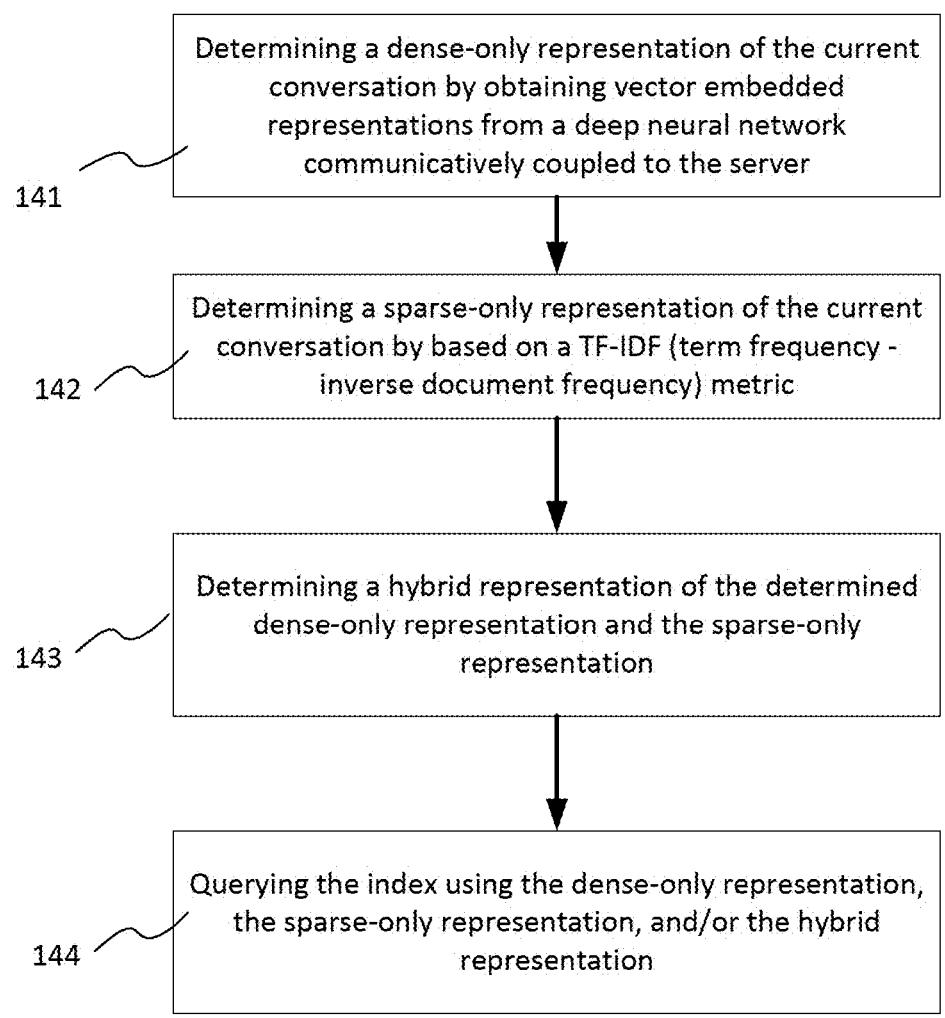

In some implementations, the server may determine the representation of the current conversation at operation 140 by performing the example operations shown in FIG. 4A. At operation 141, the server may determine a dense-only representation of the current conversation by obtaining vector embedded representations from a deep neural network communicatively coupled to the server. At operation 142, the server may determine a sparse-only representation of the current conversation by based on a TF-IDF metric. At operation 143, the server may determine a hybrid representation of the determined dense-only representation and the sparse-only representation. At operation 144, the server may query the index generated at operation 130 by using the dense-only representation, the sparse-only representation, and/or the hybrid representation.

Figure 4B:
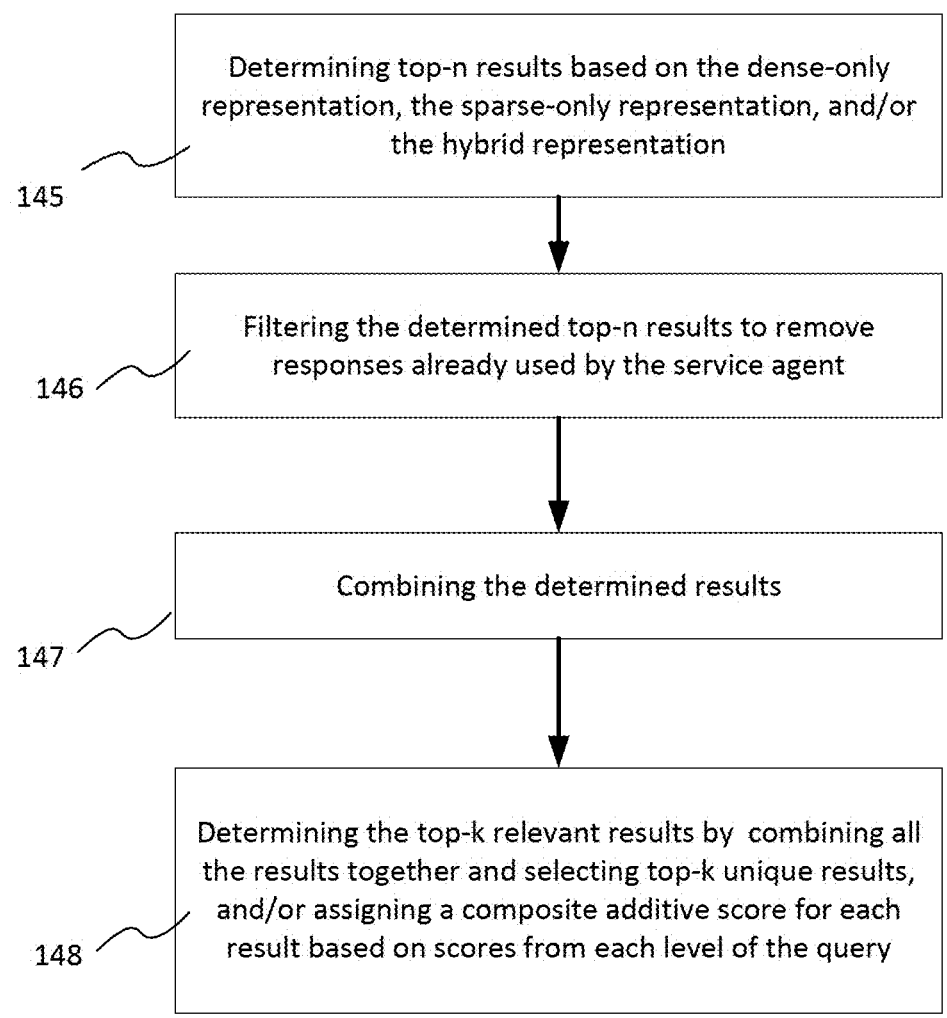

In some implementations, the server may determine top-n results based on the dense-only representation, the sparse-only representation, and/or the hybrid representation as shown in operation 145 of FIG. 4B. For example, at operation 145, the server may determine top-n results from the index based on hybrid retrieval operation, where the hybrid retrieval may be based on a weighted average of dense-only sparse-only relevance scores between the query and document representations in the database.

At operation 146, the server may filter the determined top-n results to remove responses already used by the service agent. The filtering may be performed by the server because the indexing may mean that the query context has about 80% overlap with that of the preceding and successive turn in the index, resulting in a higher likelihood of retrieving replies and/or actions that have been used before by service agents. The 80% overlap is merely an example, as the overlap percentage may depend on a choice of turns for local context and/or global context. For example, if past-5 turns is chosen for the index, this may result in the aforementioned 80% overlap. Again, the overlap percentage may depend on the number of turns chosen for indexing, and thus there may be different overlap percentages.

The server may combine the determined results at operation 147. The server may determine the top-k relevant results of the combined results by combining all the results together and selecting top-k unique results, and/or assigning a composite additive score for each result based on scores from each level of the query to the generated index at operation 148.

Figure 9:
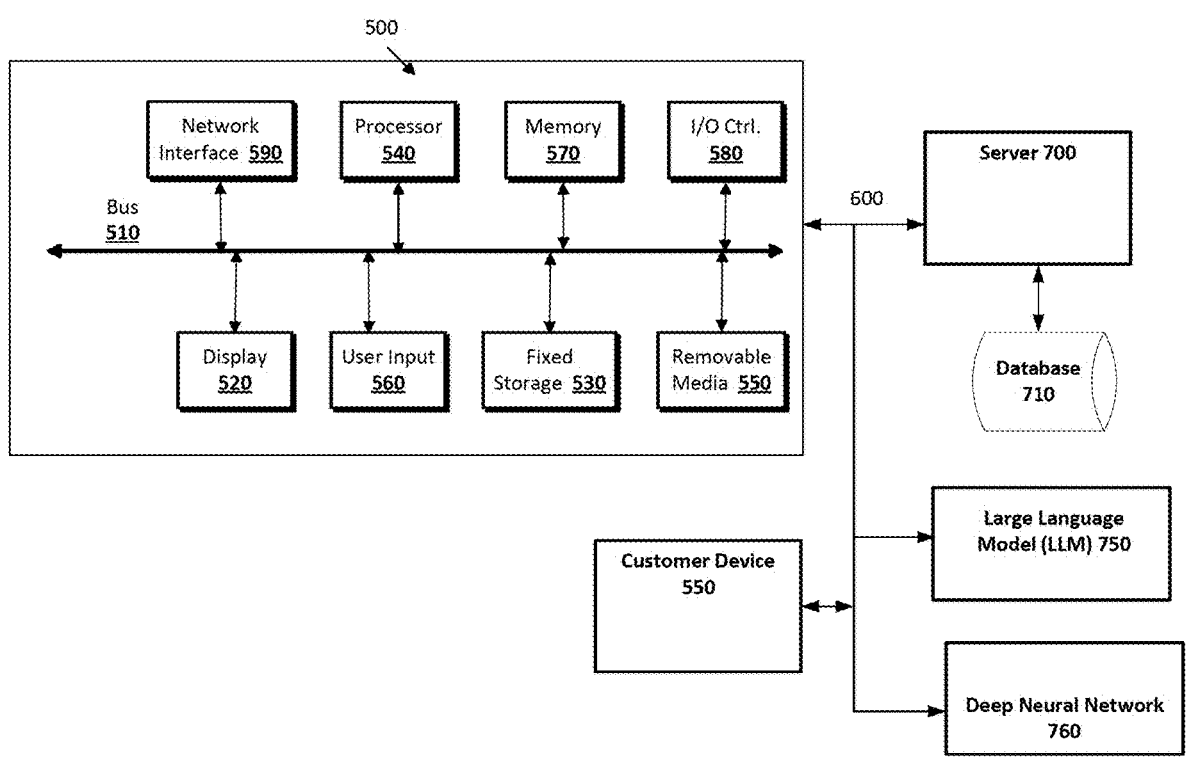
FIG. 9 shows an example computer system to perform the example methods of FIGS. 1-5 and process the example prompts shown in FIGS. 6-8 according to an implementation of the disclosed subject matter.

At operation 150 shown in FIG. 1, the server may generate a response for the service agent by using a LLM (e.g., LLM 750 shown in FIG. 9 that is communicatively coupled to server 700 via communications network 600). The server may provide a prompt to the LLM using one of the example prompt structures shown in FIGS. 6-7 and described below. In some implementations, the server may provide a prompt to the LLM that may be based on instructions, retrieved results, chat context, and the like. The length of the chat that may be used in the prompt to be provided by the server to the LLM may be different from that used in the index.

When the server receives the response generated by the LLM, the server may transmit the response to the service agent (e.g., computer 500 shown in FIG. 9) to be used in the conversation with the customer. In some implementations, the generating the response by the server at operation 150 may include generating a text response, and/or generating one or more actions to be performed. The text and/or the actions may be based on the context of the conversation between the agent and the customer. For example, the actions may include a look-up operation to determine a status of an order for the customer, a look-up operation to determine account details of the customer, or the like).

Figure 5:
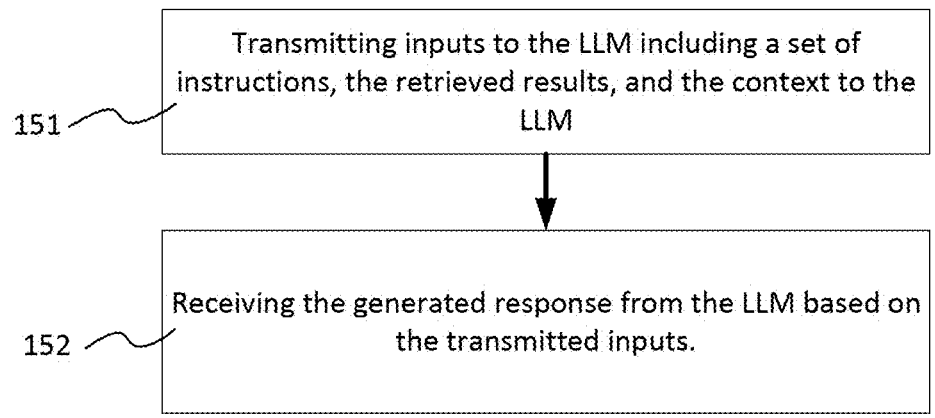

In some implementations, the server may generate a response at operation 150 using the operations shown in FIG. 5. At operation 151, the server (e.g., server 700 shown in FIG. 9) may transmit inputs to the LLM (e.g., LLM 750 shown in FIG. 9) including a set of instructions, the retrieved results, and/or the context to the LLM. At operation 151, the server may receive the generated response from the LLM based on the transmitted inputs. In some implementations, the service agent may edit and/or revise the response received from the server using the user input 560 of the computer 500 before providing the response to a device 550 of the customer.

In some implementations, the LLM (e.g., LLM 750 shown in FIG. 9) may be tuned and/or trained based on the environment of the service representative. For example, the LLM may be tuned and/or trained to generate responses and/or synthetic conversations based upon style guidelines, product and/or service documents and/or manuals for a company and/or organization, historically accumulated data from service agent interactions, and the like to increase the relevance of responses and/or synthetic conversations to be generated. For example, the LLM may be periodically retrained based on new accumulated conversations between service agents and customers. In another example, the LLM may be retrained based on new products, services, and/or policies by the company or organization of the service agent.

Figure 6:
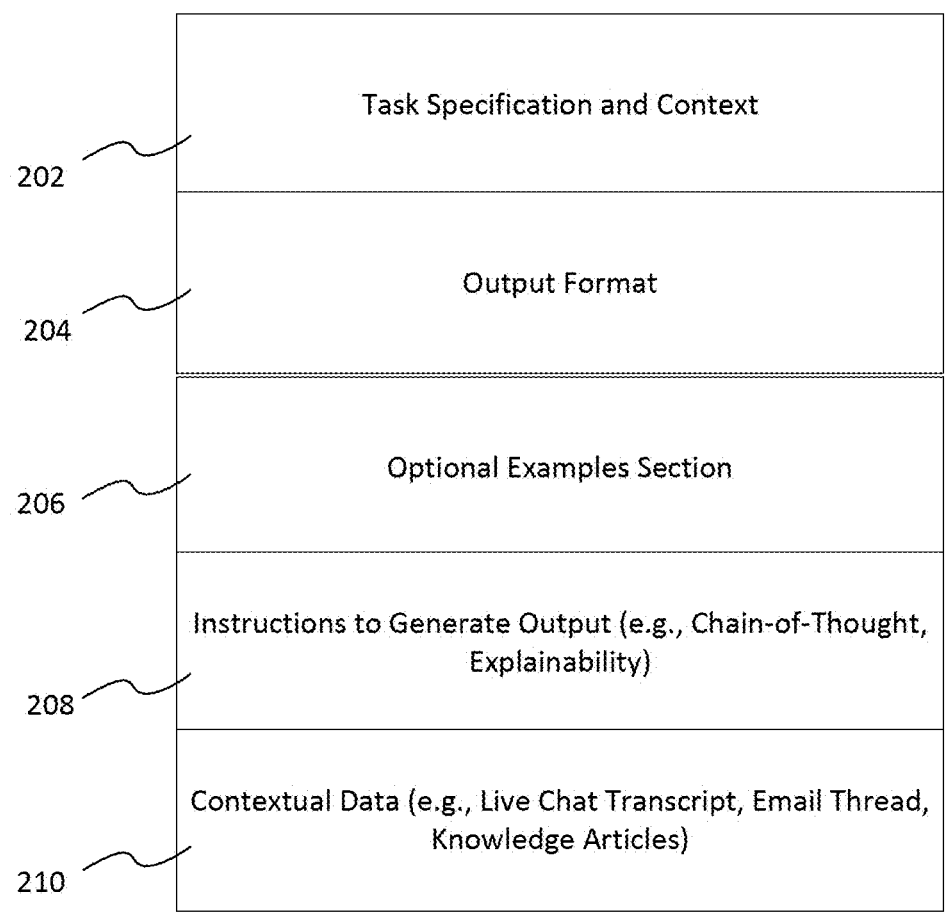
FIG. 6 shows an example of different sections of a prompt for a Large Language Model (LLM) according to an implementation of the disclosed subject matter.
Figure 7:
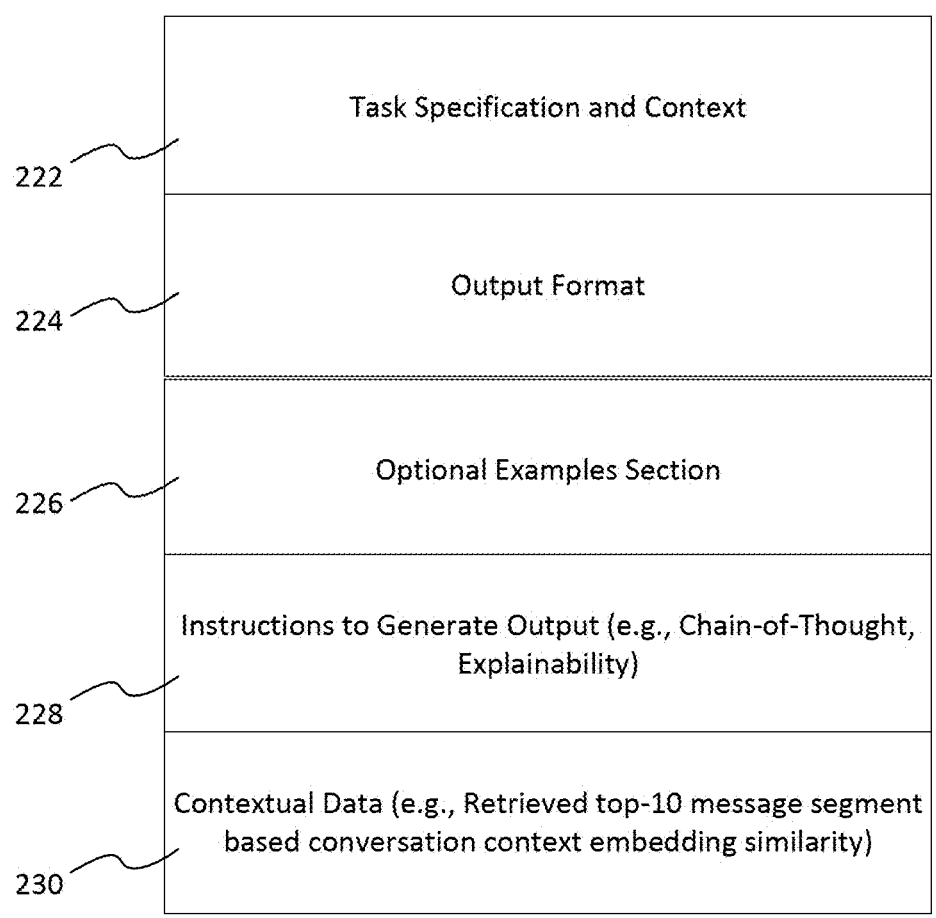
FIG. 7 shows an example of a response generation prompt for an LLM according to an implementation of the disclosed subject matter.
Figure 8:
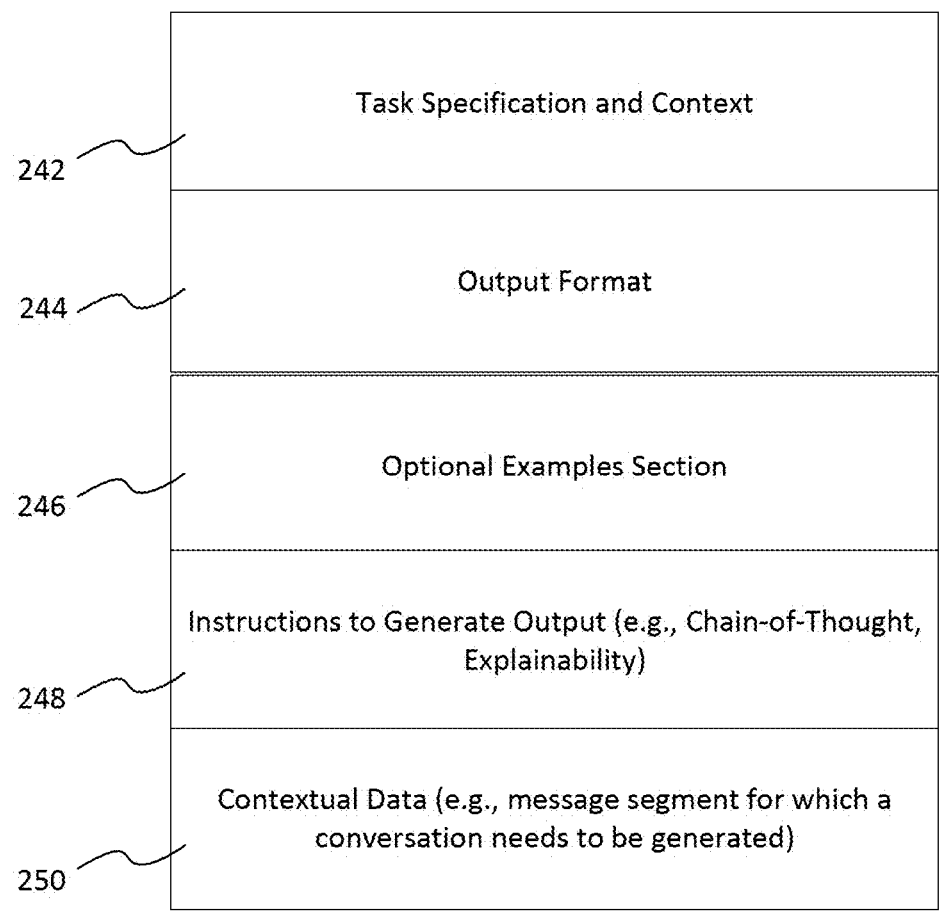
FIG. 8 shows an example of a synthetic conversation generation prompt to generate a message segment when there is no usage data according to an implementation of the disclosed subject matter.

FIGS. 6-8 show example structures for prompts to be sent to the LLM by the server (e.g., at operation 150 of FIG. 1). FIG. 6 shows an example prompt structure 200, which may include task specification and context 202. This may include the task to be performed by the LLM (e.g., generate a message, an action to be performed, or the like), and the context for the task (e.g., which may be based on the conversation between the service agent and the customer). For example, the task specification may be to assist the service agent in a response to a customer in an ongoing customer service conversation provided with the prompt. The task specification may request a suggestion for between two to three unique responses for the service agent to use in the conversation, where the suggestion may be for the service agent to use next in the conversation, it concise and friendly, and does not repeat what the service agent has already said to the customer. The task specification may include that if the customer's words may be considered unethical and inappropriate, the response should not repeat the inappropriate words.

Output format 204 may determine the format of message segment, action, or the like to be output by the LLM. For example, the output format may specify following JSON format for the next agent response in English based on sample message segment replies in the database to find at least one message that can address the customer issue. An example output format is provided below in connection with instructions to generate the output 208 below.

Optional example section 206 may be examples provided to the LLM by the server to be used to generate the output, which may be at least a portion of the conversation that the service agent has already had with the customer, or may be previous conversation examples between a service agent and a customer.

Instructions to generate the output 208 may provide a step-by-stem process that the LLM to use to generate the output. The following may be an example set of instructions:

Step 1: Identify two or three replies that addresses the issue presented by the customer and provide a response as output based on an output format. If relevant, prioritize process-rich replies over canned replies. If a relevant reply may allow the service agent to gracefully close the conversation, include the reply. Strictly ensure that the content of the replies have not already been used by the agent before. Extract each relevant response's "id", "sourceRecordId", "message" and "entity" fields.

Step 2: If you find at least one relevant and non-repetitive response, set "reply_relevant" to 1.

Step 3: If you are unable to find a relevant and non-repetitive reply, set "reply_relevant" to 0, set "id" to none, "sourceRecordId" to none, "message" to none and "entity" fields to none.

Step 4: If "reply_relevant" was set to 1 in step 2, then set the <generated response>

Step 5: Strictly do not include any links, URLs (Uniform Resource Locators), or article ids in the "response" field.

Step 6: Strictly ensure that your suggestion is not repeating what the service agent has already stated.

In the example instructions above, the "id" (e.g., identifying number), "sourceRecordId" (e.g., identification of the source of the record), "message", "entity", "reply_relevant" (e.g., value for if a relevant response is found in a database of responses to be used based on context) fields may be part of a desired format for a response (e.g., desired format 202 above). An example desired format may be:

{{
  "reply_relevant": <0 or 1>,
  "responses":[
  {{
  "response":<generated response>,
  "source":
  {{
     "id":<id>,
     "sourceRecordId": <sourceRecordId>,
     "entity": <entity>
  }}
  }}
  ]
}}

Optional Contextual data 210 of prompt structure 200 may be text data (e.g., transcript of chat between the service agent and the customer; email or text threads, and the like), voice data (e.g., voice data between the service agent and the customer, which may be converted to text), one or more reference documents (e.g., and the like from the current conversation between the service agent and the customer).

FIG. 7 shows prompt structure 220, which may be a response generation prompt that is provided by the server to the LLM, which may be used in connection with operation 150 of FIG. 1. Task specification and context 222 may be similar to the task specification and context 202, output format 224 may be similar to output format 204, optional example section 226 may be similar to optional example section 206, and instructions to generate output 228 may be similar to instructions to generate output 208 shown in FIG. 6. The contextual data 230 may be similar to contextual data 210 of FIG. 6, but may include, for example, retrieved top 10 message segments or other suitable number of message segments based on the context of the conversation between the service agent and the customer (e.g., the similarity between the similarity of context between the current conversation and the index of embedded message segments arranged by context).

FIG. 8 shows prompt structure 240 which may be provided from a server to the LLM for synthetic conversation generation as part of operation 112 shown in FIG. 1 and described above. Task specification and context 242 may be similar to task specification and context 202 of FIG. 6. In task specification and context 242, the task specification may be to generate a conversation between a service agent and a customer provided with the prompt. The task specification may have the customer request information or have a question related to a product or service from an organization of the service agent, and may include a response by the service agent that asks follow up questions based on the customer inquiry, and provides a statement that answers the customer's inquiry.

Output format 244 may be similar to output format 204 of FIG. 6. Output format 244 may determine the format of message segment, action, or the like to be output by the LLM. For example, the output format may specify following JSON format for the customer inquiry, the service agent response or follow up questions, responses by the customer to the service agent follow up questions, and a response by the service agent which provides an answer to the customer inquiry in English.

Optional example section 246 may be similar to optional examples section 206 of FIG. 6. Optional example section 246 may be examples provided to the LLM by the server to be used to generate the synthetic conversation. The examples may be similar and/or past conversations that service agents may have had with customers to address different issues, problems, and/or questions than those in the present conversation between the service agent and the customer.

Instructions to generate output 248 may be similar to instructions to generate output 208 of FIG. 6. For example, the instructions to generate output 248 may include instructions to generate a synthetic conversation between a service agent and a customer based on an issue presented by the customer and provide the synthetic conversation as output based on an output format.

Contextual data 250 may include a message segment for which a conversation needs to be generated. For example, the message segment may be from a current conversation between the service agent and a customer, and the prompt may use at least a portion of this conversation to generate the synthetic conversation. In some implementations, past conversations between one or more service agents and customers may be used to generate the synthetic conversation.

Implementations of the disclosed subject matter may be implemented in and used with a variety of component and network architectures. FIG. 9 is an example computer 500 suitable for the operations detailed in method 100 and FIGS. 1-5. As discussed in further detail herein, the computer 500 may be a single computer in a network of multiple computers. The computer 500 may be a device used by an agent in connection with the example methods discussed above in connection with FIGS. 1-5. Customer device 550 may be a computer that is similar to computer 500, and may have similar components. The customer device 500 may receive responses from the service agent's computer 500.

In some implementations, the computer 500 may be used to receive one or more responses generated by server 700, large language model (LLM) 750, and/or deep neural network 760, and may transmit them to customer device 550 via communications network 600. As shown in FIG. 9, the computer 500 may communicate with a server 700, database 710, LLM 750, and/or a deep neural network 760 via a wired and/or wireless communications network 600. The server 700, the LLM 750, and/or the deep neural network 760 may be a hardware server, virtual machine, cloud server, database, cluster, application server, neural network system, or the like. Although one server 700, database 710, LLM 750, and deep neural network 760 are shown, there may be a plurality of servers and or databases communicatively coupled to communications network 600. The server 700 may be communicatively coupled to database 710 and/or may include database 710. The database 710 may use any suitable combination of any suitable volatile and non-volatile physical storage mediums, including, for example, hard disk drives, solid state drives, optical media, flash memory, tape drives, registers, and random access memory, or the like, or any combination thereof. The database 710 may store data, such as service resource calendar data, open time slots of the service resource, scheduled time slots of the service resource, and the like. The LLM 750 may generate message segments to be used by the agent and/or generate synthetic conversations as described above. The deep neural network 760 may perform dense-only indexing by obtaining vector embedded representations as described above.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random-access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces.

The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks. The service resource 404 and/or one or more user devices 750 may have components that are similar to the computer 500 described above.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "sampling", "indexing", "generating", "performing", "combining", "transmitting", "receiving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general-purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
 determining, at a server communicatively coupled to a database, whether any past conversation texts in the database include one or more message segments used by one or more service agents in a conversation with a customer;
 sampling, at the server, m-furthest neighbors for at least one of the determined past conversation texts to determine usage data for the at least one of the determined past conversation texts, wherein m denotes at least one selected from a group consisting of: a number of samples of the determined past conversation texts, and one or more clusters of the one or more message segments of the determined past conversation texts;
 indexing, at the server, the samples for at least one of the determined past conversation texts for retrieval based on a context from the determined usage data to generate an index, wherein the index is generated by at least one selected from a group consisting of: performing dense-only indexing by obtaining vector embedded representations from a deep neural network communicatively coupled to the server that is pretrained for the context to generate a dense-only representation, and performing sparse-only indexing by determining a representation based on a TF-IDF (term frequency-inverse document frequency) metric for the context to generate a sparse-only representation;

querying, at the server, the generated index based on at least one selected from a group consisting of: the dense-only representation, and the sparse-only representation to determine top-n results based on the query;

transmitting, at the server to a large language model (LLM) communicatively coupled to the server, a set of instructions, the top-n results determined from the querying of the generated index, and the context to the LLM; and generating, at the LLM, a response based on the received inputs, wherein the generated response is transmitted to the service agent to be used in the conversation with the customer.

2. The method of claim 1, wherein the determining whether any past conversation texts in the database include the message text comprises:

determining, at the server, a fuzzy similarity score based on at least one selected from a group consisting of: the sparse-only representation; and the dense-only representation, wherein the determining whether any past conversation texts in the database include the message text is based on the determined fuzzy similarity score.

3. The method of claim 1, wherein when it is determined that there are no past conversation texts in the database include the message text, generating synthetic conversation text using the LLM and sampling the m-furthest neighbors using the generated synthetic conversation text.

4. The method of claim 1, wherein the indexing comprises:

indexing the samples for at least one of the determined past conversation texts for retrieval based on the context from the determined usage data for a local-context index; and indexing the samples for at least one of the determined past conversation texts for retrieval based on the context from the determined usage data for a global-context index.

5. The method of claim 1, wherein the sparse-only representation is determined based on a bag-of-words representation that is a set of unordered words.

6. The method of claim 1, wherein the generating the index further comprises:

performing, at the server, hybrid indexing by:
performing, at the server, the dense-only indexing and the sparse-only indexing,
wherein the hybrid indexing combines the dense-only and sparse-only indexing.

7. The method of claim 1, wherein the determining the representation of a current conversation comprises:

determining, at the server, a hybrid representation of the determined dense-only representation and the sparse-only representation, wherein at least one selected from the group consisting of: the dense-only representation, the sparse-only representation, and the hybrid representation are used by the server to query the index.

8. The method of claim 7, further comprising:

determining, at the server, the top-n results based on the at least one selected from the group consisting of: the dense-only representation, the sparse-only representation, and the hybrid representation.

9. The method of claim 8, further comprising:

filtering, at the server, the determined top-n results to remove responses already used by the service agent.

10. The method of claim 9, further comprising:

combining, at the server, the determined results; and determining, at the server, the top-k relevant results by at least one selected from the group consisting of: (1) combining all the results together and selecting top-k unique results; and (2) assigning a composite additive score for each result based on scores from each level of the query.

11. The method of claim 1, wherein the generating the response comprises at least one selected from the group consisting of: generating a text response, and generating one or more actions.

12. A system comprising:

a database system comprises one or more storage devices;

a server including a processor communicatively coupled to a memory device and the database system, wherein the server:

determines whether any past conversation texts in the database include one or more message segment used by one or more service agents in a conversation with a customer;

samples m-furthest neighbors for at least one of the determined past conversation texts to determine usage data for the at least one of the determined past conversation texts, wherein m denotes at least one selected from a group consisting of: a number of samples of the determined past conversation texts, and one or more clusters of the one or more message segments of the determined past conversation texts;

indexes the samples for at least one of the determined past conversation texts for retrieval based on a context from the determined usage data to generate an index, wherein the index is generated by at least one selected from a group consisting of: performing dense-only indexing by obtaining vector embedded representations from a deep neural network communicatively coupled to the server that is pretrained for the context to generate a dense-only representation, and performing sparse-only indexing by determining a representation based on a TF-IDF (term frequency-inverse document frequency) metric for the context to generate a sparse-only representation;

queries the generated index based on at least one selected from a group consisting of: the dense-only representation, and the sparse-only representation to determine top-n results based on the query;

transmit to a large language model (LLM) communicatively coupled to the server a set of instructions, the determined top-n results, and the context to the LLM; and generates, at the LLM, a response that is transmitted to the service agent to be used in the conversation with the customer.

13. The system of claim 12, wherein the server determines whether any past conversation texts in the database include the message text by determining a fuzzy similarity score based on at least one selected from a group consisting of: the sparse-only representation; and the dense-only representation, wherein the server determines whether any past conversation texts in the database system include the message text is based on the determined fuzzy similarity score.

14. The system of claim 12, wherein when it is determined that there are no past conversation texts in the database include the message text, generating synthetic conversation text using the LLM and sampling the m-furthest neighbors using the generated synthetic conversation text.

15. The system of claim 12, wherein the server indexes the samples for at least one of the determined past conversation texts for retrieval based on the context from the determined usage data for a local-context index, and indexes the samples for at least one of the determined past conversation texts for retrieval based on the context from the determined usage data for a global-context index.

16. The system of claim 12, wherein the representation is determined by the server based on a bag-of-words representation that is a set of unordered words.

17. The system of claim 12, wherein the server generates the index by performing hybrid indexing by: performing the dense-only indexing and performing the sparse-only indexing, wherein the hybrid indexing combines the dense-only and sparse-only indexing.

18. The system of claim 12, wherein the server determines the representation of a current conversation by:

determining a hybrid representation of the determined dense-only representation and the sparse-only representation, wherein at least one selected from the group consisting of: the dense-only representation, the sparse-only representation, and the hybrid representation are used by the server to query the index.

19. The system of claim 18, wherein the server determines the top-n results based on the at least one selected from the group consisting of: the dense-only representation, the sparse-only representation, and the hybrid representation.

20. The system of claim 19, wherein the server filters the determined top-n results to remove responses already used by the service agent.

21. The system of claim 20, wherein the server combines the determined results, and determines the top-k relevant results by at least one selected from the group consisting of: (1) combining all the results together and selecting top-k unique results; and (2) assigning a composite additive score for each result based on scores from each level of the query.

22. The system of claim 12, wherein the server generates the response by performing at least one selected from the group consisting of: generating a text response, and generating one or more actions.

* * * * *